April 21, 1942.    O. B. VETTER    2,280,325
FLOW AND PRESSURE MEASURING DEVICE
Filed June 8, 1940
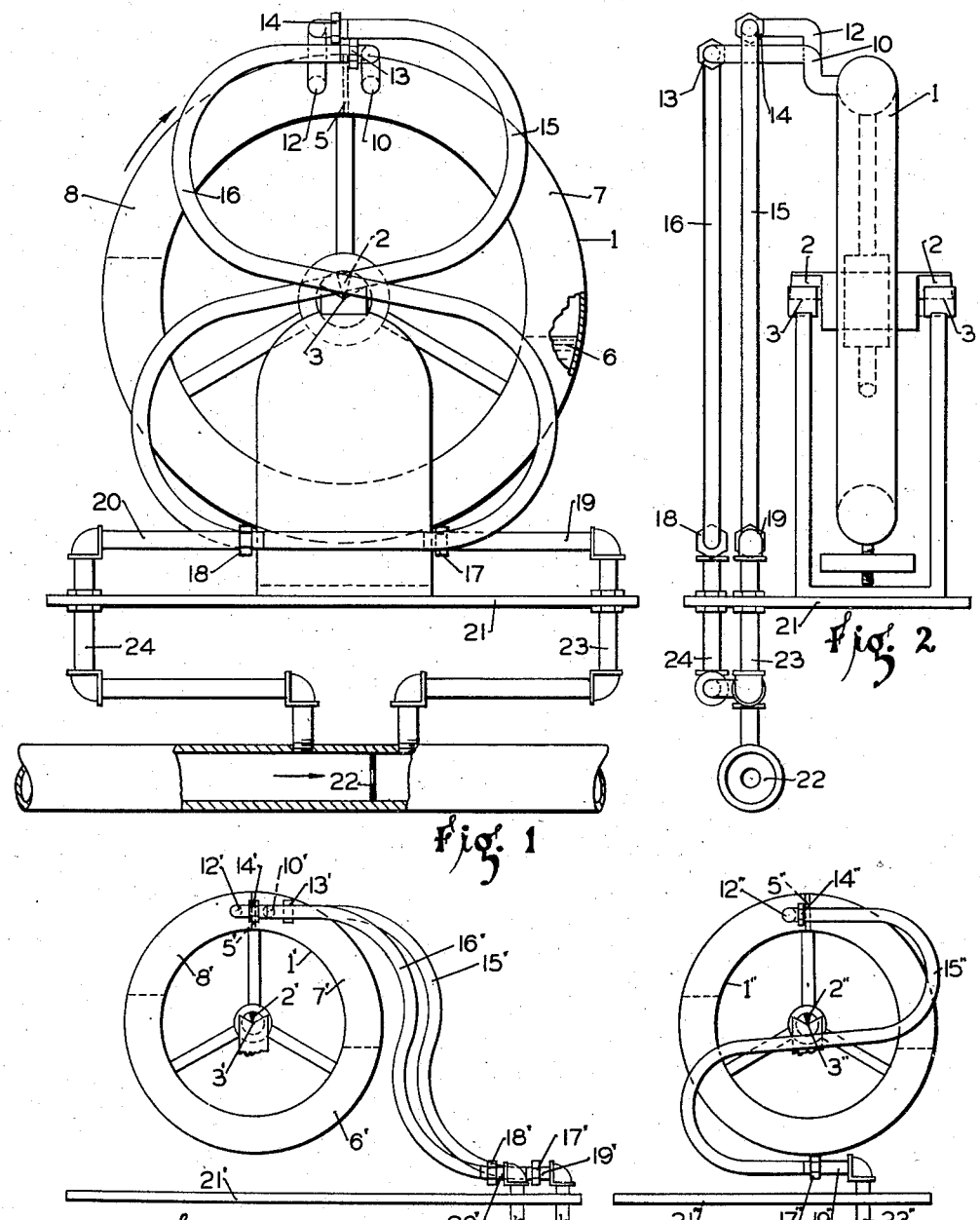
INVENTOR
Otto B. Vetter Patented Apr. 21, 1942

2,280,325

UNITED STATES PATENT OFFICE 2,280,325

FLOW AND PRESSURE MEASURING DEVICE

Otto B. Vetter, Chicago, Ill., assignor to Ring Balance Instrument Company, Chicago, Ill., a corporation of Illinois Application June 8, 1940, Serial No. 339,455

15 Claims. (Cl. 73—31)

This invention consists of an improvement in pressure and differential gages in which differences in pressures of various fluids under pressure are conveyed to a tilting mechanism divided into pressure chambers, the angular deflection of the mechanism being a measure of the difference in pressure which it is desired to ascertain. In such mechanism it is ordinarily necessary to provide flexible connections from the source of pressure into the tilting mechanism in such a manner that these connections will interfere as little as possible with the normal rotation of the mechanism.

This flexible connection has ordinarily been provided by a bent tubular member rather than a straight piping connection in order to provide the necessary flexibility. Under conditions of relatively low static pressures very light and soft tubing may be used and sufficient flexibility attained so that the interference with the motion of the ring may be made quite negligible. When, however, it is desired to measure differential pressures with a relatively high static pressure, as for example, 100 to 500 lbs. per square inch or more, the tubing must be made quite heavy and the sensitivity of the flexible connection becomes a limiting factor in the accuracy of this type of measuring device.

When the static pressures are very high as compared to the differentials to be measured, another difficulty is presented, due to the fact that variations in static pressures are likely to occur which would set up differential stresses within the flexible tubing itself because of the curvatures in the tubing. It is well known that any curved tubing has a tendency to act as a pressure responsive device, since any increase in pressure tends to straighten out the tubing and thus creates a rather substantial force which varies as the static pressure varies. The ordinary method of compensating for this difficulty is to utilize two pressure connections arranged so as to be curved in opposite directions; one connected to each side of the differential device, so that any such unbalanced effects produced by changes in pressure are approximately balanced out.

It is well known, however, that it is practically impossible and quite impractical to get two tubes of exactly the same characteristics so that all such devices have been subjected to some error due to pressure variation. As a result of this fact, tilting mechanisms have been, in general, limited either to very low pressures or to very small angular rotations or else their usefulness as a differential device has been seriously impaired.

The object of the present invention is to provide flexible connections for pressure or differential pressure measuring devices which will be sufficiently flexible so that they produce no appreciable reaction upon the movement of the devices.

A further object is to provide flexible connections for pressure or differential pressure measuring devices that will permit these devices to move so freely that there will be no error in registration because of changes in static pressure within the connections.

A further object is to provide a single flexible connection for a pressure measuring instrument in which all the reactions due to changes in static pressure are balanced out so that a change in static pressure will not cause an error in the registration of the instrument.

Another object is to provide tubes for transmitting pressure to the chambers of a ring balance, said tubes having substantially no tendency to impede the rotation of said ring balance about its axis.

Another object is to provide tubes which will produce substantially no deflection of the ring balance to which they are connected, due to the static pressure in said tubes.

Another object is to provide an arrangement for tubular connections, such that said ring balance may be operated under a variety of different static pressures without calibration of said ring balance for each said operating static pressure.

The present invention is illustrated by way of example in the accompanying drawing in which, Figure I is a rear elevational view, with portions broken away to show the interior, of a typical differential measuring apparatus embodying my improvements.

Figure II is a side elevational view of the apparatus shown in Figure I.

Figure III illustrates another embodiment of the invention.

Figure IV illustrates an embodiment of the invention having a single flexible connection.

The particular device used for illustration is of the type commonly referred to as a "Ring balance," in which an annular ring 1 is carried on a rotatable bearing 2 so as to be free to rotate around the axis 3. The annular space within the ring is provided with a partition 5 and sealed with a fluid 6, so as to form on opposite sides of the partition, high and low pressure chambers 7 and 8. A pressure connection 10 leads from high pressure chamber 7 and makes a right angle bend into a plane parallel to the plane of the ring and at right angles to the radius, and in like manner, pressure connection 12, connected to low pressure chamber 8, is bent into a plane parallel with pipe 10, but projecting out beyond the piping 10 and pointing in an opposite direction to pipe 10.

Secured to pipes 10 and 12 by means of union connections 13 and 14 are flexible connections 15 and 16. These may be made of metallic tubing or of softer materials as are available in the form of tubing. Where great sensitivity is necessary in the measuring device, metal tubing is usually too stiff to give sufficient flexibility so that it is usually preferable to use some of the softer materials as, for example, reinforced armoured tubing or some synthetic compound reinforced with fabric or metallic springs, or reinforced rubber hose.

The flexible connectors 15 and 16 are then bent in a substantial S shape as shown in Figure I, and connected at their terminals by means of unions 17 and 18 to pipe connections 19 and 20 supported from a housing or baseplate 21. Pipe connections 19 and 20 are connected to the device whose pressure differential is to be measured, which, by way of illustration, is shown in Figure I as a typical orifice mechanism 22, which produces a differential pressure when fluid passes through it. The two sides of the orifice are connected to the compartments of the ring balance by means of the connections 24, 20, 16 and 10, and 23, 19, 15 and 12. The end connections 14 and 17 of flexible connection 15 and likewise end connections 13 and 18 of flexible connection 16, are located so that the axis of the two ends of the flexible connections lie in the same plane and so that the open ends of each of these tubes point in a direction which is substantially opposite to the opposite end of the flexible connection.

When the ring 1 rotates, the connections 10 and 12 move around the axis 3 and this motion is substantially in line with the longitudinal axis of the connections 15 and 16 at the point where they join the union connections 13 and 14. Attaching the flexible connections in this manner minimizes changes in shape of the tubing with rotation of the ring 1. Since the angular motion of the ring 1 is usually limited to approximately 30 degrees, the change in position causes a very gradual and slight change in the curvature all along the flexible connections 15 and 16 so that the relative position of the flexible connections with respect to the rigid piping remains approximately fixed.

The piping is usually located so that the longitudinal axes of the flexible tubing are parallel to each other in the midway position of rotation so that the slight angular deviation caused by rotation of the ring is reduced to a minimum. In the exceptional case of a fluid meter where much greater sensitivity is required at the minimum or zero end of the scale due to its square root characteristic, it is sometimes preferable to arrange the tubing so that these axes are parallel at the minimum extreme of the ring motion, since much greater working forces are available at the other positions and the greatest flexibility is needed at the zero position. In either case, however, the angular deviation with the arrangement shown produces a negligible effect on the registration and, therefore, either type of fastening can be used successfully.

Figure III shows an arrangement of tubing very similar to that of Figure I, except that the flexible connections 15' and 16' are arranged in a different manner. Whereas in Figure I connectors 15 and 16 are arranged so as to pass through the center of rotation 3, this is not true in the type of connection shown in Figure III. The flexible tubes 15' and 16' connect the high and low pressure areas of a typical orifice mechanism to the appropriate compartments in the ring balance. As is plainly shown in Figure III, each of said tubes is arranged to form two curved portions facing in opposite directions. The connections 23' and 24' which join the orifice mechanism to the tubes 15' and 16' need not be in the plane in which the ring 1 rotates.

This arrangement of tubing is sometimes more convenient than that shown in Figure I but does not give as great flexibility. The flexible connectors 15' and 16' are both shown placed on the same side of the axis of the ring. This is possible because each of the individual connections is balanced within itself and it is not necessary to oppose the two tubes. This fact permits of great flexibility of arrangement of the tubing and is another inherent advantage of my invention.

When pressure is applied to the mechanism the tubing assumes a shape so that all the forces acting on each one of the tubes individually balance out. The pressure reactions at the ends of the tubes obviously balance out since they face in opposite directions and any unbalance in forces on either half of the tube is automatically balanced out by opposing unbalanced forces in the other half of the tube.

In Figure IV an embodiment of the invention is shown where only a single flexible connection 15" is utilized. One end of said connection 15" communicates with a chamber in the rotatable member 1" through the pipe 12"; the other end of said flexible connection 15" is connected to the pipe 23" which may communicate with a source of pressure or of vacuum. Thus the angular deflection of the rotatable member 1" may be used to measure pressures. Even with a single flexible connection as shown in this figure, all the unbalanced forces due to change in pressures will cancel out and it is, therefore, possible to utilize the device with only one flexible connection without having errors due to reactions within this connection.

In this respect it differs greatly from flexible connections which have been previously used, in that each one of the flexible connections in my invention is inherently balanced out within itself and it is not necessary to produce two identical and compensating connections, in order to eliminate any extraneous effects due to pressure on the connections.

It is obvious that almost any flexible material in this type of connection can be utilized to bring about the desired result.

What I claim is:

1. In a measuring device including a hollow torus rotatable about its center, a flexible tube disposed in S-shaped configuration with one end fixed below the center of said torus and the other end connected with said torus above its center.

2. In a measuring device including a pivoted wheel having a hollow rim, deformable tubing arranged in "S" shape with one end stationary and the other end connected with said rim, the ends of said tubing being on opposite sides of the pivot of said wheel.

3. In a pressure measuring device including a vertically rotatable torus, a connection for transmitting pressure to the interior of said torus, comprising a flexible tube arranged with its axis approximately in one plane and bent into alternating curves, the terminal portions of said tube being approximately parallel and oppositely directed, one of said terminal portions being connected with the upper portion of said torus, the other terminal portion being connected to a fixed inlet below the axis of said torus, the arrangement of said tube imparting flexing characteristics thereto whereby said connection causes substantially no error in the measurement.

4. In pivoted pressure-responsive mechanism, a pressure connection comprising a stationary inlet positioned below the pivot of said mechanism, and a flexible tube formed into two curves facing away from each other, one end of said tube being connected to said inlet and the other end being connected with said mechanism above said pivot, whereby the deflection of said mechanism due to the Bourdon effect in said pressure connection is rendered negligibly small.

5. In pressure-responsive mechanism including a vertically disposed ring pivoted about its center, a pressure connection exerting substantially no force in the direction of movement of said ring, comprising a stationary inlet positioned near the bottom of said ring, a conduit protruding from said ring near the top thereof, and a flexible tube connecting said conduit with said inlet, said tube being formed in substantially vertical S-shape with the terminals approximating the horizontal.

6. In a measuring device including a rotatable ring, a deformable S-shaped tube fixed at one end and connected at the other end with said ring, the axis of said tube remaining approximately in one plane regardless of the rotation of said ring, said plane being parallel to and spaced from the central plane of said ring.

7. In a measuring device including a rotatable ring, a deformable tube stationary at its lower end and connected at its upper end with said ring, the axis of said tube lying approximately in a plane spaced from and parallel to the central plane of said ring, said tube maintaining an "S" configuration throughout the range of rotation of said ring.

8. In a measuring device including a rotatable ring, a flexible tube bent into two loops oppositely disposed to form an "S" arranged approximately in a plane spaced from and parallel to said ring, one end of said "S" being stationary and the other end being connected with said ring, whereby deflection of said ring changes the size of said loops relative to each other without destroying said "S" configuration.

9. In measuring instruments, the combination with a hollow ring pivoted upon a horizontal axis, of a flexible tube disposed in vertical S-shaped configuration with its lower end fastened below said axis and its upper end connected with the upper portion of the interior of said ring.

10. In a measuring device, the combination with a rotatable ring, of a flexible tube having one end fixed and the other end connected with said ring, said tube being arranged in S form with its axis approximately in a plane normal to the axis of said ring, the height of said S approximating the diameter of said ring.

11. In a ring-balance or the like, the combination with a pivoted ring body, of a deformable pressure connection therefor arranged in S form with its axis approximately in a plane spaced from and parallel to the central plane of said ring.

12. In combination, a hollow ring pivoted upon a horizontal shaft, a rigid inlet protruding from the upper portion of said ring, and a flexible tube connected to said inlet and arranged in S form with its center adjacent said shaft and its axis approximately in a plane spaced from and parallel to the central plane of said ring.

13. In a pressure responsive device of the ring-balance type, the combination with a pivoted ring body, of a pressure connection therefor which impedes the rotation of said ring body less than the sensitivity of said pressure responsive device, comprising a pliable tube arranged in S form with its center adjacent the pivot of said ring body and its axis approximately in a plane spaced from and parallel to the central plane of said ring body.

14. In combination, a pivoted hollow ring and a pair of flexible tubes connected with the interior of said ring, each of said tubes being arranged into an S, said tubes being overlapped to form a figure 8.

15. In combination, a shaft, a wheel on said shaft, a hollow rim on said wheel, liquid and a partition within said hollow rim, and a pair of S-shaped tubes facing in opposite directions and overlapped to form a figure 8 with the center of said 8 adjacent said shaft.

OTTO B. VETTER.